/ 1
3,067,196
PROCESS FOR THE PREPARATION OF STEROIDS SUBSTITUTED IN THE 12-POSITION AND PRODUCTS RESULTING THEREFROM
Robert Joly, Montmorency, and Jean Jolly, Fontenay-sous-Bois, France, assignors, by mesne assignments, to Roussel-UCLAF, S.A., Paris, France, a corporation of France
No Drawing. Filed June 15, 1960, Ser. No. 36,176
Claims priority, application France June 18, 1959
14 Claims. (Cl. 260—239.55)

The present invention relates to a process for the preparation of steroids substituted in the 12-position. It more particularly relates to a process for the preparation of 12-methylene-$\Delta^4$-pregnene-3,20-dione and the products resulting therefrom. This compound has the formula:

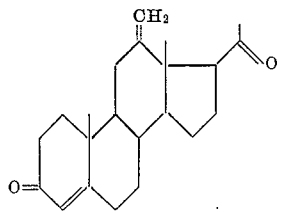

It is therefore an object of this invention to prepare 12-methylene-$\Delta^4$-pregnene-3,20-dione.

Another object of this invention is to provide a process for the preparation of 12-methylene-$\Delta^4$-pregnene-3,20-dione, VI.

A further object of the invention is the preparation of the novel intermediates:

(a) 3,20-bis-ethylenedioxy-$\Delta^5$-pregnene-12α-ol, II.
(b) 3,20-bis-ethylenedioxy-$\Delta^5$-pregnene-12-one, III.
(c) 3,20-bis-ethylenedioxy-12-hydroxy-12-methyl-$\Delta^5$-pregnene, IV.
(d) 3,20-bis-ethylenedioxy-12-methylene-$\Delta^5$-pregnene, V.
(e) 3-ethylenedioxy-12-methylene-$\Delta^5$-pregnene-20-one,
(f) and 12 - hydroxy - 12 - methyl - $\Delta^4$ - pregnene - 3,20-dione, VII.

These and other objects of the invention will become more apparent as the description thereof proceeds.

According to the process of the invention, the new steroid is prepared by the succession of reactions shown on schematic flow sheet of Table I.

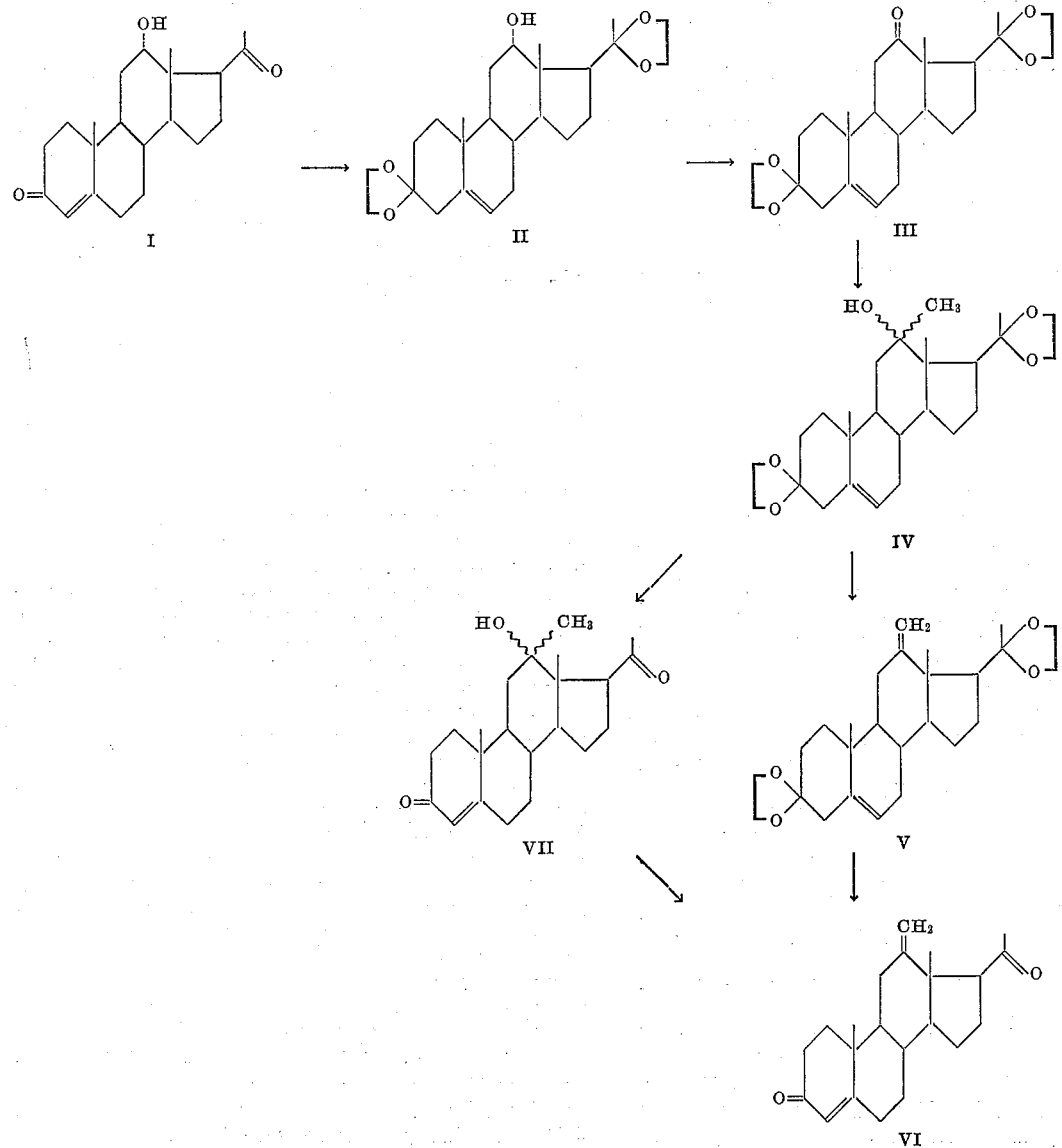

These reactions consist of reacting the carbonyl of 3,20-bis-ethylenedioxy-$\Delta^5$-pregnene-12-one, III, with a Grignard reagent, such as methyl magnesium bromide, in an inert organic solvent to transform it at a temperature of about $-5°$ to $+5°$ C. into a corresponding 12-hydroxy-12-methyl derivative IV. This compound IV is then dehydrated, preferably with acid agents, such as thionyl chloride in the presence of a basic organic solvent at a temperature from about $-20$ to $0°$ C., into 3,20-bis-ethylenedioxy-12-methylene-$\Delta^5$-pregnene, V. The compound V is hydrolyzed with an acid such as acetic acid at a temperature of about $70°$ to $90°$ C. to obtain the desired compound VI.

A variation of the process of the invention consists of effecting the hydrolysis of the diethylene ketal before the dehydration of the 12-hydroxy-12-methyl grouping.

The starting material, 3,20-bis-ethylenedioxy-$\Delta^5$-pregnene-12-one, III, is obtained by treating 12α-hydroxy-$\Delta^4$-pregnene-3,20-dione, I, with ethylene glycol in an inert solvent at reflux temperature to form the diethylene-ketal. This alcohol compound II is then oxidized in the 12-position with chromic acid in the presence of an inert solvent.

The 12-methylene-$\Delta^4$-pregnene-3,20-dione, VI, exhibits progestational properties and can be used, moreover, as the intermediate product for the synthesis of steroids, for example, for the production of 12-methylene-17α,21-dihydroxy-$\Delta^4$-pregnene-3,20-dione, by microbiological hydroxylation in the 17- and 21-positions. This latter compound has the activity of a progestational agent.

The following examples are given to illustrate the invention and make it better understood to persons skilled in the art, and it will be understood that the examples are not limitative.

The melting points are instantaneous melting points determined on a Maquenne block. The temperatures are indicated in degrees centigrade.

EXAMPLE I

*Preparation of 12-Methylene-$\Delta^4$-Pregnene-3,20-Dione, VI*

(a) *3,20 - bis - ethylenedioxy - $\Delta^5$ - pregnene - 12α - ol, II.*—100 cc. of ethyleneglycol were mixed with one liter of benzene, then 10 gm. of 12α-hydroxy-progesterone (Ch. Meystre et al., Helv. Chim. Acta, 1948, vol. 31, page 1463) and 0.4 gm. of p-toluene sulfonic acid were introduced. The reaction mixture was heated to reflux under agitation for 20 to 22 hours. Next, the mixture was cooled, 200 cc. of water and 10 cc. of a 5% solution of sodium bicarbonate were added thereto. The solution was allowed to stand for several minutes and was decanted. The aqueous phase was extracted with benzene and the combined organic phases were washed with water until neutral. The combined phases were then dried over magnesium sulfate, filtered and made weakly alkaline medium by the addition of several drops of pyridine. The solvent was eliminated by distillation and a crystallized light yellow residue was obtained, melting point=150-155° C. The raw product, obtained thereby, was recrystallized from methanol. 6.4 gm. (that is 52% of theory) 3,20-bis-ethylenedioxy-$\Delta^5$-pregnene-12α-ol II, was recovered, melting point=180 to 182° C. specific rotation $[\alpha]_D^{20}=+11°$ (c.=0.5%, acetone). The product is obtained in the form of white prismatic flakes, soluble in acetone, benzene and chloroform, soluble in warm methyl and ethyl alcohols, less soluble in isopropyl ether and insoluble in water. It is not described in the literature.

*Microanalysis.*—$C_{25}H_{38}O_5=418.55$. Calculated: C, 71.73%; H, 9.15%; O, 19.11%. Found: C, 71.7%; H, 9.1%; O, 19.2%.

Infra-red spectrum: absence of conjugated and non-conjugated ketones.

By acid hydrolysis of the mother liquors, 2.8 gm. of pure 12α-hydroxy-progesterone was recovered.

(b) *3,20 - bis - ethylenedioxy - $\Delta^5$ - pregnene - 12 - one, III.*—4.3 gm. of chromic acid was introduced very slowly into 43 cc. of pyridine cooled to 0° C. The temperature of the acid mixture was allowed to rise to 15 to 20° C. and 4.3 gm. of the diketal II in 21.5 cc. of pyridine were added thereto. The reaction mixture was then agitated at room temperature for 16 hours. Next, the chromopyridine complex was vacuum filtered and washed several times with pyridine, then with acetone. The pyridine liquors were combined and 860 cc. of a mixture of water and ice were added thereto. This mixture was then agitated at 0° C. for an hour. Compound III was precipitated and vacuum filtered. The precipitate was washed with water and taken up in 50 cc. methylene chloride. It is again washed with water and then dried over magnesium sulfate. After treatment with animal charcoal and vacuum filtration, the solvent was distilled under an atmosphere of nitrogen in the presence of one part per thousand of pyridine to obtain 3.6 gm. of 3,20-bis-ethylenedioxy-$\Delta^5$-pregnene-12-one, III (that is 85.5% of theoretical yield), directly useable for the rest of the synthesis, melting point=228 to 229° C.

For analysis, this product was purified by recrystallization from methanol under reflux. Melting point=230 to 231° C., specific rotation $[\alpha]_D^{20}=+35°$ (c.=0.5%, acetone). The product is soluble in methanol, chloroform and acetone and insoluble in water and ether.

*Analysis.*—$C_{25}H_{36}O_5=416.53$. Calculated: C, 72.08%; H, 8.71%; O, 19.20%. Found: C, 72.2%; H, 8.5%; O, 19.3%.

The infra-red spectrum agrees with the structure.

It was possible to recover in addition a second yield of the product by triturating the vacuum filtered chromopyridine complex with dichloroethane in the cold, then hot. The dichloroethane liquor was washed successively with water, normal sulfuric acid, sodium bicarbonate and water. The dichloroethane was distilled off and 0.35 gm. of the product was obtained. After trituration with methanol under reflux, 0.29 gm. (that is 6.5% of theory) of compound III melting at 228 to 229° C. was recovered.

Compound III is not described in the literature.

(c) *3,20 - bis - ethylenedioxy - 12 - hydroxy - 12 - methyl - $\Delta^5$ - pregnene, IV.*—Under agitation and in an atmosphere of nitrogen, 3.7 gm. of compound III were introduced into 40 cc. of methyl magnesium bromide, in an ethereal solution titrating 2.7 mol/kg. The mixture, thus formed, was agitated for an hour at 0° C. It was then allowed to stand over night at 0° C. After this, the cooling was interrupted, the mixture was allowed to stand at room temperature for an hour. Then 40 cc. benzene were added thereto. Next it was poured into a mixture of water and ice containing 21 gm. of ammonium chloride. It was agitated while maintaining the temperature at 0° C. for one half hour and 50 cc. benzene were added. The mixture was then decanted and the aqueous phase was extracted three times with benzene. The combined benzene phases were washed with water until neutral, dried over magnesium sulfate and treated with one part per thousand of pyridine. The benzene was eliminated by distillation in an atmosphere of nitrogen and 3.6 gm. of raw compound IV were obtained, melting point=162° C. This product was crystallized in hot ethanol to recover 2.23 gm. of 3,20-bis-ethylenedioxy-12-hydroxy-12-methyl-$\Delta^5$-pregnene IV (that is 58% of theory), melting point=180 to 181° C. The product was useable as such for the rest of the synthesis. After a second recrystallization a product melting at 183 to 184° C. was obtained, specific rotation $[\alpha]_D^{20}=+8.9°$ (c.=0.5%, in acetone). Compound IV is soluble in benzene and chloroform, in hot methanol and ethanol. It is slightly soluble in hot ethyl and isopropyl ether and insoluble in water.

*Microanalysis.*—$C_{26}H_{40}O_5=432.58$. Calculated: C, 72.18%; H, 9.32%. Found: C, 72.4%; H, 9.2%.

It is not described in the literature.

(d) *3,20 - bis - ethylenedioxy - 12 - methylene - $\Delta^5$ - pregnene, V.*—1 gm. of compound IV was dissolved in 25 cc. of pyridine. The solution was cooled to $-20°$ C. and 4.5 cc. of thionyl chloride were introduced dropwise.

The mixture developed a yellow color rapidly. The temperature was allowed to rise to 0° C. and, after 30 minutes, the reaction mixture was poured into a mixture of water and ice containing 25 cc. of a 10% aqueous solution of sodium bicarbonate. The precipitate which formed was vacuum filtered, washed with water, then redissolved in 50 cc. of methylene chloride. The solution was washed with water and dried over magnesium sulfate. It was then treated with animal charcoal, and afterwards concentrated to dryness under nitrogen to obtain 860 mgm. of raw 3,20-bis-ethylenedioxy-12-methylene-$\Delta^5$-pregnene V, melting point=155 to 156° C.

Ultraviolet spectrum: absence of conjugated ketone. Infrared spectrum: band at 1640 cm.$^{-1}$ and at 891 cm.$^{-1}$ (12-methylene).

The product was employed as such in the following stage of the synthesis.

The corresponding 3-monoketal, 3-ethylenedioxy-12-methylene-$\Delta^5$-pregnene-20-one was also isolated, melting point is 182 to 183° C., which can be used also for the following stage of the synthesis.

*Microanalysis.*—$C_{24}H_{34}O_3=370.51$. Calculated: C, 77.79%; H, 9.25%; O, 12.95%. Found: C, 77.5%; H, 9.3%; O, 13.4%.

The ultraviolet spectrum: absence of conjugated ketone.

Neither product V, nor the monoketal are described in the literature.

(e) *12-methylene-$\Delta^4$-pregnene-3,20-dione, VI.*—860 mgm. of compound V in 8.5 cc. of acetic acid, containing 50% water, were heated under agitation to 80° C. The heating was continued for two hours, then 90 cc. of iced water were added and the acetic acid was neutralized with a 10% solution of sodium bicarbonate to a pH of 7 to 8. The solution was extracted with methylene chloride several times. The extracts were combined and washed with water and dried over magnesium sulfate. After filtration, the solvent was distilled and a yellowish orange gum weighing 581 mgm. and consisting of raw 12-methylene-$\Delta^4$-pregnene-3,20-dione, VI, $\epsilon=16\,300$ at 240$\mu$, was obtained. 433 mgm. of the raw product were dissolved in 5 cc. benzene and 1 cc. of cyclohexane was added. This mixture was subjected to chromatography over alumina and eluted successively with a mixture of benzene and cyclohexane (5:1), with pure benzene, and pure methanol. The first eluate furnished the purest product. It was recrystallized in isopropyl ether and 132 mgm. of 12-methylene-$\Delta^4$-pregnene-3,20-dione, VI, was obtained, melting point=131 to 132° C. specific rotation $[\alpha]_D^{20}=+157°$ (c.=0.5%, in acetone).

Ultraviolet spectrum: conjugated ketone, $\epsilon=16\,300$ at 240$\mu$. Infra-red spestrum: band at 891 cm.$^{-1}$ corresponding to exocyclic methylene.

*Microanalysis.*—$C_{22}H_{30}O_2=326.46$. Calculated: C, 80.93%; H, 9.26%. Found: C, 80.9%; H, 9.0%.

This product is obtained in the form of white prismatic needles, soluble in acetone and chloroform, soluble in hot isopropyl ether and insoluble in water.

It is not described in the literature.

EXAMPLE II

*Preparation of 12-Methylene-$\Delta^4$-Pregnene-3,20-Dione, VI*

3 gm. of 3,20-bis-ethylenedioxy-12-hydroxy-12-methyl-$\Delta^5$-pregnene IV, obtained according to Example I(c), were dissolved in 15 cc. of acetic acid containing 50% water. The mixture was heated to 80° C. under agitation in an atmosphere of nitrogen for two hours. The mixture was then cooled, after which the solution is poured into 150 cc. of iced water. Crystallization was initiated by the addition of a small quantity of isopropyl ether. The acetic acid was neutralized with a saturated solution of sodium bicarbonate. The solution was agitated for a half hour, then vacuum filtered. After washing with water and drying, 2.07 gm. of raw 12-hydroxy-12-methyl-$\Delta^4$-pregnene-3,20-dione, VII, were obtained, melting point=145° C.

This product was purified by recrystallization in a hot mixture of isopropyl ether and ethyl acetate (1:1), melting point=150 to 150.5° C., specific rotation $[\alpha]_D^{20}=+173°$ C. (c.=0.5%, in acetone).

Yield: 84.5%.

Compound VII is soluble in acetone, chloroform, in methyl and ethyl alcohol, slightly soluble in ether and insoluble in water.

*Analysis.*—$C_{22}H_{23}O_3=344.48$. Calculated: C, 76.7%; H, 9.36%. Found: C, 76.8%; H, 9.2%.

The ultraviolet spectrum shows a maximum at 242$\mu$, $\epsilon=16\,250$.

This compound is not described in the literature.

To obtain compound VI starting with compound VII, it was dehydrated according to Example I(d).

It is well understood that the invention is not limited to the details of the process of the invention described above. It is possible especially to vary the conditions or the other of the reactions, to modify the nature of the solvents, to employ cyclic ketals other than the ethylene ketal for the protection of the ketone functions or to use dehydration agents other than thionyl chloride without departing from the scope of the present invention.

We claim:
1. 3,20-bis-ethylenedioxy-$\Delta^5$-pregnene-12$\alpha$-ol.
2. 3,20-bis-ethylenedioxy-$\Delta^5$-pregnene-12-one.
3. 3,20 - bis - ethylenedioxy - 12$\epsilon$ - methyl -12$\epsilon$-hydroxy-$\Delta^5$-pregnene.
4. 3,20-bis-ethylenedioxy-12-methylene-$\Delta^5$-pregnene.
5. 3-ethylenedioxy-12-methylene-$\Delta^5$-pregnene-20-one.
6. 12$\epsilon$-hydroxy-12$\epsilon$-methyl-$\Delta^4$-pregnene-3,20-dione.
7. A process for preparing a 12-methylene derivative of the pregnane series which comprises the steps of reacting a 12-keto steroid of the pregnane series with a Grignard reagent to form the 12-hydroxy-12-methyl derivative and dehydrating said 12-hydroxy-12-methyl derivative with a thionyl halids to obtain the corresponding 12-methylene steroid.
8. A process for preparing a 12-methylene derivative of the pregnane series which comprises the steps of ketalating a 12-keto stroid of the pregnane series to form cyclic ketals of keto groups not in the 12-position, reacting said ketal with a Grignard reagent to form the 12-hydroxy-12-methyl derivative and dehydrating said 12-hydroxy-12-methyl derivative with a thionyl halide to obtain the corresponding 12-methylene steroid.
9. The process of claim 8 wherein the ketals are hydrolyzed under acidic conditions before dehydration of the 12-hydroxy-12-methyl grouping.
10. The process of claim 8 wherein the ketals are hydrolyzed under acidic conditions after dehydration of the 12-hydroxy-12-methyl grouping.
11. The process of claim 8 wherein the acid agent is thionyl chloride.
12. A process for producing 12-methylene-$\Delta^4$-pregnene-3,20-dione which comprises the steps of (1) ketalating 12$\alpha$-hydroxy-$\Delta^4$-pregnene-3,20-dione to form 3,20-bis-ethylenedioxy-$\Delta^5$-pregnene-12$\alpha$-ol, (2) oxidizing said ketal in the 12 position with a chromic acid to obtain 3,20-bis-ethylenedioxy-$\Delta^5$-pregnene-12-one, (3) reacting said derivative of step (2) with a methyl Grignard reagent to obtain 3,20 - bis-ethylenedioxy-12-hydroxy-12-methyl-$\Delta^5$-pregnene, (4) dehydrating said 12-hydroxy-12-methyl derivative with a thionyl halide to form 3,20-bis-ethylenedioxy-12-methylene-$\Delta^5$-pregnene and (5) hydrolyzing said 12-methylene derivative under acidic conditions to obtain the desired 12-methylene-$\Delta^4$-pregnene-3,20-dione.
13. A process for producing 12-methylene-$\Delta^4$-pregnene-3,20-dione which comprises the steps of (1) ketalating 12$\alpha$-hydroxy-$\Delta^4$-pregnene-3,20-dione in an inert solvent at reflux temperatures, to form 3,20-bis-ethylenedioxy-$\Delta^5$-pregnene-12$\alpha$-ol, (2) oxidizing said ketal in the 12 posi- tion with a chromic acid in the presence of an inert organic solvent to obtain 3,20-bis-ethylenedioxy-Δ⁵-pregnene-12-one, (3) reacting said derivative of step (2) with a methyl Grignard reagent in an inert organic solvent to obtain 3,20-bis-ethylenedioxy-12-hydroxy-12-methyl-Δ⁵-pregnene, (4) dehydrating said 12-hydroxy-12-methyl derivative with a thionyl halide in the presence of a basic organic solvent to form 3,20-bis-ethylenedioxy-12-methylene-Δ⁵-pregnene and (5) hydrolyzing said 12-methylene derivative under acidic conditions at elevated temperature to obtain the desired 12-methylene-Δ⁴-pregnene-3,20-dione.

14. A process for producing 12-methylene-Δ⁴-pregnene-3,20-dione which comprises the steps of (1) ketalating 12α-hydroxy-Δ⁴-pregnene-3,20-dione in an inert solvent at reflux temperatures, to form 3,20-bis-ethylenedioxy-Δ⁵-pregnene-12α-ol, (2) oxidizing said ketal in the 12 position with a chromic acid in the presence of an inert organic solvent to obtain 3,20-bis-ethylenedioxy-Δ⁵-pregnene-12-one, (3) reacting said derivative of step (2) with a methyl Grignard reagent in an inert organic solvent to obtain 3,20-bis-ethylenedioxy-12α-hydroxy-12-methyl-Δ⁵-pregnene, (4) hydrolyzing said pregnene derivative under acidic conditions at elevated temperature to obtain 12-hydroxy-12-methyl-Δ⁴-pregnene-3,20-dione, and (5) dehydrating said 12-hydroxy-12-methyl derivative with a thionyl halide in the presence of a basic organic solvent to form 12-methylene-Δ⁴-pregnene-3,20-dione.

References Cited in the file of this patent
UNITED STATES PATENTS 2,954,375    Miramontes et al. _____ Sept. 27, 1960